Jan. 2, 1945. A. WARMISHAM 2,366,661
OPTICAL OBJECTIVE
Filed Nov. 23, 1943
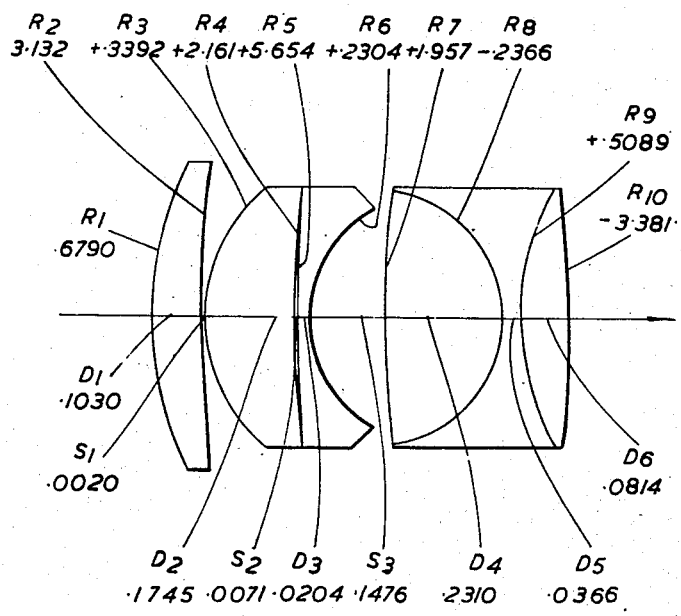
Inventor
A. WARMISHAM Patented Jan. 2, 1945

2,366,661

UNITED STATES PATENT OFFICE 2,366,661

OPTICAL OBJECTIVE

Arthur Warmisham, Leicester, England, assignor to Taylor, Taylor & Hobson Limited, Leicester, England, a company of Great Britain Application November 23, 1943, Serial No. 511,431
In Great Britain November 3, 1942

8 Claims. (Cl. 88—57)

This invention relates to an optical objective for photographic and like purposes, corrected for spherical and chromatic aberrations, coma, astigmatism, field curvature and distortion, of the kind comprising an asymmetrical simple divergent component disposed behind two simple convergent components and in front of another convergent component. It should be made clear that the side of the longer conjugate is herein referred to as the "front" of the objective in accordance with the usual convention.

The present invention has for its object to provide an objective of the above-mentioned kind which will be well-corrected for a semi-angular field as large as 23° at an aperture of F/1.5.

To this end according to the invention the convergent rear component is in the form of a triplet having a divergent element cemented between two convergent elements, and the mean refractive index of the material used for such divergent middle element is less than that for either of the convergent elements cemented to it, the index differences each lying between .06 and .16. The front cemented surface in the rear component is preferably concave to the front and conveniently has radius of curvature between .19 and .28 times the equivalent focal length of the objective.

Preferably at least two of the four convergent elements of the objective are made of materials having mean refractive index greater than 1.64. The divergent third component is preferably made of a material having mean refractive index greater than 1.68. The rear surface of the convergent second component and the front surface of the divergent third component are preferably both convex to the front.

Preferably the front surfaces of the convergent first and second components are convex to the front with radii of curvature respectively lying between .62 and .72 and between .30 and .40 times the equivalent focal length of the objective, whilst the rear surface of the divergent third component is convex to the front with radius of curvature lying between .18 and .28 times such focal length and the rear surface of the convergent rear component is concave to the front with radius of curvature between 3.0 and 4.0 times such focal length.

A preferred practical example of objective according to the invention is illustrated in the accompanying drawing, and numerical data therefor are given in the following table in which $R_1R_2$ ... represent the radii of curvature of the individual surfaces, the positive sign indicating that the surface is convex to the front and the negative that it is concave thereto, $D_1D_2$ ... represent the axial thicknesses of the individual elements, and $S_1S_2S_3$ represent the axial air separations between the components. The table also gives the mean refractive indices for the D-line and the Abbé $\nu$ numbers of the glasses of which the various elements are made.

| Equivalent focal length 1.000 | | Relative aperture F/1.5 | |
|---|---|---|---|
| Radius | Thickness or air separation | Refractive index $n_D$ | Abbé $\nu$ number |
| $R_1 +.6790$ | $D_1 .1030$ | 1.644 | 48.3 |
| $R_2 +3.132$ | $S_1 .0020$ | | |
| $R_3 +.3392$ | $D_2 .1745$ | 1.644 | 48.3 |
| $R_4 +2.161$ | $S_2 .0071$ | | |
| $R_5 +5.654$ | $D_3 .0204$ | 1.748 | 27.8 |
| $R_6 +.2304$ | $S_3 .1476$ | | |
| $R_7 +1.957$ | $D_4 .2310$ | 1.644 | 48.3 |
| $R_8 -.2366$ | $D_5 .0366$ | 1.530 | 52.0 |
| $R_9 +.5089$ | $D_6 .0814$ | 1.644 | 48.3 |
| $R_{10} -3.381$ | | | |

In this example it will be seen that all four convergent elements are made of the same dense barium flint glass, whilst an extra dense flint glass is used for the divergent third component. The glass used for the divergent middle element of the rear component has mean refractive index differing from that of the glass used for each convergent element by .114. This example is well-corrected for a semi-angular field of 23° and has a back focal length .4195 times the equivalent focal length of the objective.

What I claim as my invention and desire to secure by Letters Patent is:

1. An optical objective for photographic and like purposes corrected for spherical and chromatic aberrations, coma, astigmatism, distortion and field curvature, and comprising four components spaced in axial alignment of which the front component is a simple convergent component whose front surface is convex to the front with radius of curvature between .62 and .72 times the equivalent focal length of the objective, the second component is a simple convergent component whose front surface is convex to the front with radius of curvature between .30 and .40 times such focal length, the third component is a simple asymmetrical divergent component whose rear surface is convex to the front with radius of curvature between .18 and .28 times such focal length, and the fourth component is a convergent cemented triplet having a divergent element cemented between two convergent elements, the rear surface of the rear component being concave to the front with radius of curvature between 3.0 and 4.0 times the said focal length.

2. An optical objective as claimed in claim 1, in which the mean refractive index of the material used for the divergent middle element of the rear component is less than that for each of the convergent elements cemented to it by an amount between .06 and .16.

3. An optical objective as claimed in claim 1, in which the cemented surface between the divergent middle element of the rear component and the convergent element in front of it is concave to the front and has radius of curvature between .19 and .28 times the equivalent focal length of the objective.

4. An optical objective as claimed in claim 1, in which at least two of the four convergent elements of the objective are made of materials having mean refractive index greater than 1.64.

5. An optical objective as claimed in claim 1, in which the divergent third component of the objective is made of a material having mean refractive index greater than 1.68.

6. An optical objective as claimed in claim 1, in which at least two of the four convergent elements of the objective are made of materials having mean refractive index greater than 1.64, whilst the divergent third component is made of a material having mean refractive index greater than 1.68.

7. An optical objective as claimed in claim 1, in which at least two of the four convergent elements of the objective are made of materials having mean refractive index greater than 1.64, whilst the divergent third component is made of a material having mean refractive index greater than 1.68, the mean refractive index of the material used for the divergent middle element of the rear component being less than that for each of the convergent elements cemented to it by an amount lying between .06 and .16.

8. An optical objective as claimed in claim 1, in which the rear surface of the convergent second component and the front surface of the divergent third component are both convex to the front.

ARTHUR WARMISHAM.